(12) United States Patent
Gucea

(10) Patent No.: US 11,277,276 B2
(45) Date of Patent: Mar. 15, 2022

(54) MULTICAST PROCESSING FOR NEIGHBOR DISCOVERY PROXY DEVICES USING HARDWARE FILTERING

(71) Applicant: NXP USA, Inc., Austin, TX (US)

(72) Inventor: Doru Cristian Gucea, Bragadiru Village (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/530,983

(22) Filed: Aug. 2, 2019

(65) Prior Publication Data

US 2020/0382330 A1    Dec. 3, 2020

(30) Foreign Application Priority Data

May 31, 2019  (RO) ................ A201900326

(51) Int. Cl.
| | |
|---|---|
| *H04L 12/18* | (2006.01) |
| *H04L 12/24* | (2006.01) |
| *H04L 12/743* | (2013.01) |
| *H04L 29/12* | (2006.01) |
| *H04L 29/08* | (2006.01) |
| *H04L 41/08* | (2022.01) |
| *H04L 45/7453* | (2022.01) |
| *H04L 61/5014* | (2022.01) |

(Continued)

(52) U.S. Cl.
CPC ........ *H04L 12/189* (2013.01); *H04L 41/0876* (2013.01); *H04L 45/7453* (2013.01); *H04L 61/2015* (2013.01); *H04L 67/28* (2013.01); *H04L 61/6022* (2013.01)

(58) Field of Classification Search
CPC .............. H04L 12/189; H04L 41/0876; H04L 45/7453; H04L 61/2015; H04L 67/28
See application file for complete search history.

(56) References Cited

U.S. PATENT DOCUMENTS

| | | |
|---|---|---|
| 7,680,884 B2 | 3/2010 | Zhou et al. |
| 9,768,970 B2 | 9/2017 | Anggawijaya |

(Continued)

OTHER PUBLICATIONS

Narten, Thomas "Neighbor Discover and stateless autoconfiguration in IPv6" IEEE Internet Computing Jul./Aug. 1999 (Year: 1999).*

(Continued)

*Primary Examiner* — Jeffrey M Rutkowski
*Assistant Examiner* — Basil Ma

(57) ABSTRACT

A mechanism is provided by which a hardware filter on a border router of a wireless personal area network is not overloaded by increasing the probability that the hardware filter will capture all the nodes not on the corresponding WPAN. Network addresses for nodes within a subnet are allocated to have the same multicast address hash value in order to permit router multicast filtering to occur within hardware. Hardware filtering thereby relieves the router processor from performing filtering tasks, reducing resource consumption and decreasing the time used to perform filtering. Embodiments provide this functionality by assigning a unique multicast filter register value to each subnet within a network and allocating network addresses associated with that multicast filter register value through either DHCP or SLAAC address generation.

20 Claims, 9 Drawing Sheets

(51) Int. Cl.
  *H04L 67/56* (2022.01)
  *H04L 101/622* (2022.01)

(56) References Cited

U.S. PATENT DOCUMENTS

| | | | | |
|---|---|---|---|---|
| 2008/0263353 | A1* | 10/2008 | Droms | H04L 29/12283 713/153 |
| 2009/0178060 | A1* | 7/2009 | Winter | G06F 9/4411 719/318 |
| 2011/0225391 | A1* | 9/2011 | Burroughs | G06F 9/3885 711/216 |
| 2018/0242379 | A1* | 8/2018 | Turon | H04W 76/10 |
| 2019/0014615 | A1* | 1/2019 | Wang | H04W 4/06 |
| 2020/0084277 | A1* | 3/2020 | Somaraju | H04L 41/0806 |

OTHER PUBLICATIONS

Thread 1.1.1 Specification can be downloaded after email registration at https://www.threadgroup.org/ThreadSpec Feb. 13, 2017 (Year: 2017).*
RFC 4862 "IPv6 Stateless Address Autoconfiguration" Sep. 2007 (Year: 2007).*
RFC 2462 "IPv6 Stateless Address Autoconfiguration" Dec. 1998 (Year: 1998).*
RFC 3315 "Dynamic Host Configuration Protocol for IPv6" Downloadable from http://tools.ietf.org/html/rfc3315 (Year: 2003).*
F. Gont, A Method for Generating Semantically Opaque Interface Identifiers with IPv6 Stateless Address Autoconfiguration (SLAAC), RFC 7217, Internet Engineering Task Force, Apr. 2014 (ISSN: 2070-1721).
T. Narten et al., Neighbor Discovery for IP version 6 (IPv6), RFC 4861, Network Working Group, Sep. 2007.
Thread Group, Inc., Thread 1.1 Specification, Table 2-1, Chapter 5.23.1, and Chapter 12.1.4.1, 2015.
NXP, K64 Sub-Family Reference Manual, Document No. K64P144M120SF5RM, Rev. 2, section 45.5.4, pp. 1235-1241, Jan. 2014.
Anonymous, "Multicast address", Wikipedia, May 26, 2019, retrieved from the internet at https://web.archive.org/web/20190526160700/https://en.wikipedia.org/wiki/multicast_address on Aug. 5, 2020.
Thubert, P. et al., "IPv6 Backbone Router", 6lo Internet-Draft, draft-ietf-6lo-backbone-router-11, StandardWorkingDraft, Feb. 4, 2019, pp. 1-30, Internet Engineering Task Force, Internet Society, Geneva, Switzerland, retrieved from the internet at https://tools.ietf.org/html/draft-ietf-6lo-backbone-router-11 on Feb. 4, 2019.
Thubert, P. et al., "Wireless Neighbor Discovery Stateful Address Identification and Location exchange", 6MAN Internet-Draft draft-thubert-6man-wind-sail-00, StandardWorkingDraft, Oct. 17, 2013, pp. 1-21, Internet Engineering Task Force, Internet Society, Geneva, Switzerland.

* cited by examiner

MULTICAST PROCESSING FOR NEIGHBOR DISCOVERY PROXY DEVICES USING HARDWARE FILTERING

BACKGROUND

Field

This disclosure relates generally to multi-channel wireless personal area networks, and more specifically, to a mechanism for decreasing multicast processing for Neighbor Discovery proxy devices through use of hardware offloading.

Related Art

Wireless networking technology has become widely adopted in a number of application areas, enterprises, and residential communities. One consequence of this wide and varied use of wireless networks is a proliferation of hundreds to thousands of wireless devices coupled to premises networks (e.g., internet of things (IoT) devices) that can both transmit and receive a variety of network transmissions, which can, in turn, affect the operational performance of the networks. This especially affects routers that pass and restrict data communication between different subsets of a premises network.

One type of network communication that can present proliferation of data issues in a premises network is multicast transmission to multicast groups. A multicast group is a group of receivers that want to receive a particular data stream. This group has no physical or geographical boundaries—receivers can be located anywhere on the Internet or in any private network. Receivers that are interested in receiving data flowing to a particular multicast group must join the group by signaling their local router. Packets delivered to group members are identified by a single multicast group address. The multicast address is chosen for the receivers in a multicast group. Senders use that address as the destination address to reach all members of the group.

Wireless personal area networks (WPANs), and, in particular, Thread networks, are relatively low bandwidth networks. Thus, a border router for a WPAN should not forward all multicast traffic from an external network into the WPAN. One mechanism for accomplishing this is to have the border router act as a neighbor discovery proxy for each node within the corresponding network. But in a traditional network configuration, if a border router has a large number of proxied nodes, multicast hardware filtering capabilities of the border router can become overloaded due to hashing of multicast addresses filling up hardware registers on the border router, thus forcing software-based multicast resolution, which consumes router resources and slows responsiveness.

It is therefore desirable to provide a mechanism by which the hardware filter on border routers of WPANs, such as Thread networks, is not overloaded by increasing the probability that the hardware filter will capture all the nodes not on the corresponding WPAN.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Figure 1:
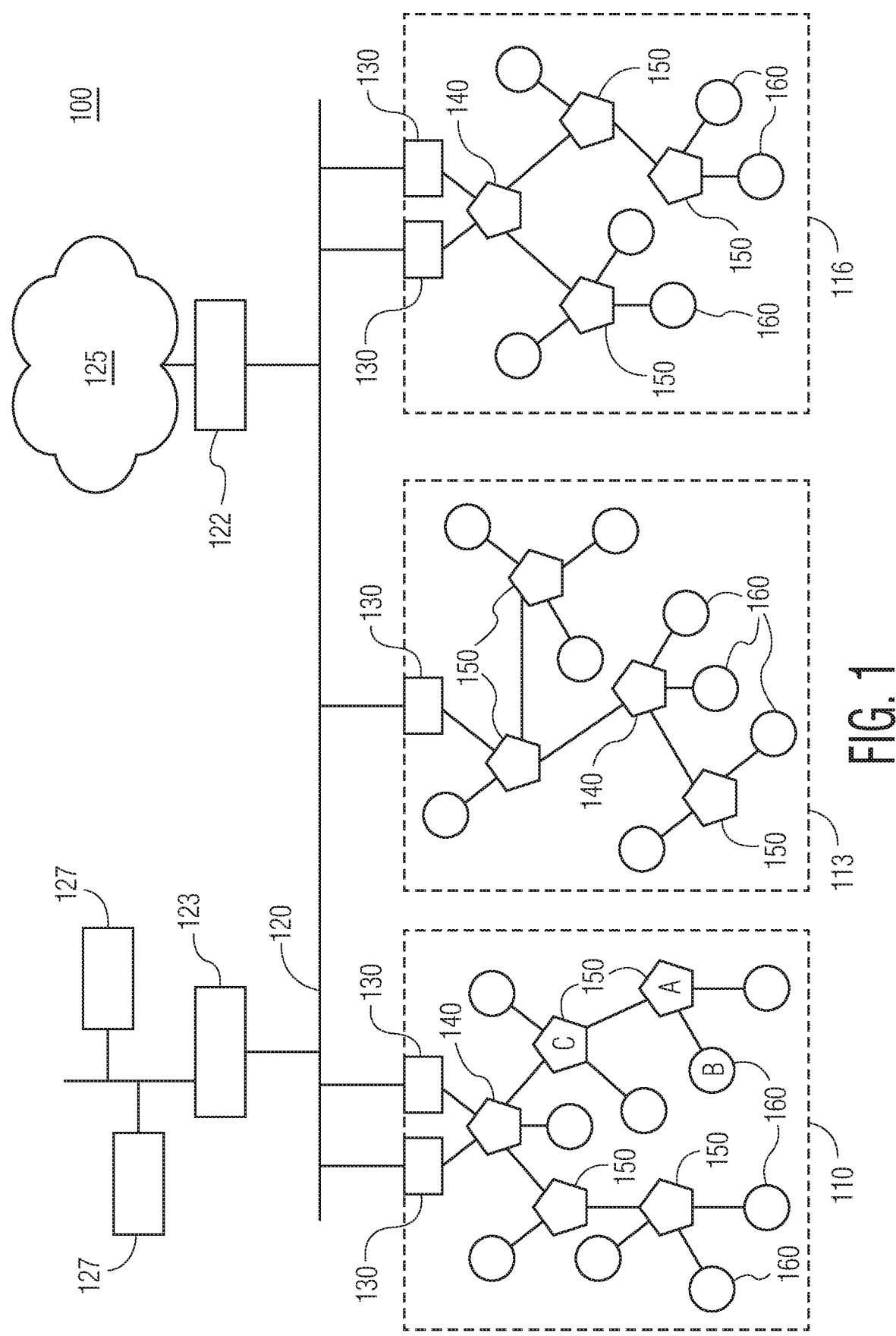
FIG. 1 is a simplified block diagram illustrating an example of a wireless mesh network within which embodiments of the present invention are configured to operate.

Embodiments of the present invention provide a mechanism for allocating network addresses for nodes within a subnet to have a same multicast address hash value in order to permit router multicast filtering to occur within hardware. Hardware filtering thereby relieves the processor of the router from performing filtering tasks, reducing resource consumption and decreasing the time used to perform filtering. Embodiments provide this functionality by assigning a multicast filter register value to each subnet within a network and allocating network addresses associated with that multicast filter register value through either Dynamic Host Configuration Protocol (DHCP) or Stateless Address Autoconfiguration (SLAAC) address generation.

A wireless mesh network is a communications network made up of radio nodes organized in a mesh topology. Wireless mesh networks typically consist of mesh routers, mesh clients or end nodes, and gateways. In a typical mesh network, the nodes are not mobile but instead are static in location so that route computations are relatively stable. Of particular interest are wireless personal area networks (WPANs) such as those defined under IEEE 802.15.4, and specifically, Thread networks, which provide simple, low-cost communications using wireless connectivity with limited power. In WPANs, objectives such as ease of installation, reliable data transfer, low cost, and reasonable battery life are met, while maintaining a simple and flexible protocol.

A WPAN, as defined under 802.15.4, can include two different types of nodes: a full-function device (FFD) and a reduced-function device (RFD). A FFD is capable of acting as a coordinator of the network. FFDs can provide routing functionality (transmitting or receiving) and other device functions. In a Thread network, FFDs are called Full Thread Devices (FTDs) and include routers, router eligible end devices, and full end devices. FTDs always have their radio on. A RFD cannot function as a coordinator of the network, but can provide transmitting or receiving functions along with other device functions. In a Thread Network, RFDs are called Minimal Thread Devices (MTDs) and include minimal end devices (e.g., radio always on and do not poll for messages from parent node) and sleepy end devices (e.g., normally disabled radio and periodically wake to poll for messages from parent node). MTDs only operate as child devices, as will be discussed more fully below. There is only one FFD configured as the network coordinator in a WPAN. The network coordinator forms the first cluster of the network and also stores critical information regarding the network. The network coordinator also performs network management decisions on behalf of the network. In a Thread Network, the network coordinator is called a Thread Leader.

In the ensuing discussion, a Thread network is used as an example environment for embodiments of the present invention. It should be noted that embodiments are not restricted to Thread networks or to WPANs, in general. Embodiments can be utilized to make multicast routing more efficient in any network having a router that functions as a neighbor discovery proxy (ND-proxy) for many nodes.

FIG. 1 is a simplified block diagram illustrating an example of a wireless mesh network within which embodiments of the present invention are configured to operate. Wireless mesh networks 110, 113, and 116 are subnetworks ("subnets") (e.g., Thread 1.1 network or Thread Network) coupled to a backbone link 120 via one or more border routers 130 (also known as a backbone border router or "BBR"). The combination of Thread Networks coupled together by a backbone link in a Thread Domain, as illustrated, can be a Thread 1.2 network. Border routers 130 are routers that can provide firewall protection for wireless mesh networks 110, 113, and 116, and forward information between each wireless mesh network and networks external to the wireless mesh networks. The border routers also configure the wireless mesh network for external connectivity. Each Thread Network has one primary border router, which is selected from the available border routers 130 in each Thread Network. If there are more than one available border router, then one is configured as a primary border router and the others are secondary border routers that back up the primary border router. Backbone link 120 couples border routers 130 to a wide area network 125 via a network router 122 and to other network nodes 127 via a network router 123.

Border routers 130 are coupled via wired or wireless connections to one or more routers within their respective subnets (as illustrated, for a Thread Network 110, border routers 130 communicate with Thread Leader 140). As discussed above, Thread Leader 140 is a router configured to handle network coordinator tasks of the associated Thread Network (e.g., 110, 113, and 116). Network coordinator tasks are dependent upon the nature of the wireless mesh network and, for Thread Networks, these tasks include aggregating and distributing network-wide configuration information within the Thread Network. Router nodes 150 are FTDs that are configured to maintain tables related to those nodes connected to the router and paths to other nodes within the network. Router nodes 150 are configured to transmit and receive messages from nodes coupled to them, perform tasks related to those messages, and forward messages to coupled nodes, as necessary. Router nodes 150 can also provide sensor, alarm, and other functionality as needed for the network configuration.

Thread Networks 110, 113, and 116 also include end nodes 160 that are coupled to associated router nodes 150. End nodes 160 can be either FTDs or MTDs, depending upon the nature of the tasks performed by the associated wireless mesh network. In some network configurations, end nodes 160 are devices that are not required to be in an active mode all the time and can therefore go into a low power, or sleepy, mode. End nodes do not provide router functionality because routing nodes need to be in an awake state most of the time. End nodes can include sensor devices, light switches, and the like, depending upon the nature of the network application.

Other examples of WPAN networks include Zigbee, 6LoWPAN, SNAP, WirelessHART, and the like. Embodiments of the present invention are not limited to the type of WPAN network, but instead are related to environments in which routers, such as border routers, perform ND-proxy tasks for a significant number of nodes.

Nodes are added to a wireless mesh network 110, 113, and 116 through a parent-child relationship between a new node and a node that is already a member of the network. As nodes join the network, the network node with which they communicate during the network association process is defined as the node's parent, and the joining node becomes a child of the parent node. In FIG. 1, for example, end device B is a child of router node A. Similarly, router node A is a child of router node C. The lines in FIG. 1 indicate parent-child relationships, and not all of the communication links.

All nodes in the network are configured to communicate using the same channel. Nodes within the wireless mesh network can communicate with more than just their parent. There are usually alternate communication paths through the network to sustain a connection. Nodes communicate through the network using a next-hop routing algorithm, wherein outgoing messages are sent through the gateway nodes.

As Thread networks are relatively low bandwidth compared to other typical premises networks, the border router by default should not forward all IP multicast traffic from an external network into the Thread network. Further, any inbound forwarding should be rate-limited to avoid flooding the Thread network. Thread border routers are typically administratively configured for specific IP multicast ingress policies, such that only certain IPv6 multicast groups, multicast protocols, or scopes are forwarded into the mesh.

One method for filtering multicast traffic is to use hardware registers loaded with a subset of a multicast address' hash. Efficiency of such a hardware filter is inversely proportional to the number of proxied nodes and directly proportional to the size of the hardware registers. For a large number of registered multicast addresses, the filter efficiency significantly can drop and much of the multicast filtering will be performed in software, which puts pressure on the processor of the border router. Thus, for a ND-proxy device, such as a border router, with a large number of proxied nodes, the hardware filtering capabilities can become overloaded because the hashes of the multicast addresses easily fill up the hardware registers and the border router ends up behaving as in a promiscuous mode (i.e., allowing all multicast traffic).

In some border router devices, hardware filtering capabilities can be limited. For example, some border routers use two 32-bit registers for filtering based on the multicast address hash. Such hardware filters are designed to filter a small number of group addresses, in which case there is acceptable efficiency. But in Thread 1.2 networks, border routers are ND-proxy devices for the devices within the associated subnet, and the border routers therefore can be called upon to proxy for hundreds of multicast groups. Rather than have multicast filtering be performed in software, thereby putting pressure on the router processor, embodiments of the present invention provide a mechanism for choosing multicast addresses of proxied nodes such that the efficiency of the hardware hash table will be greatly increased.

Figure 2:
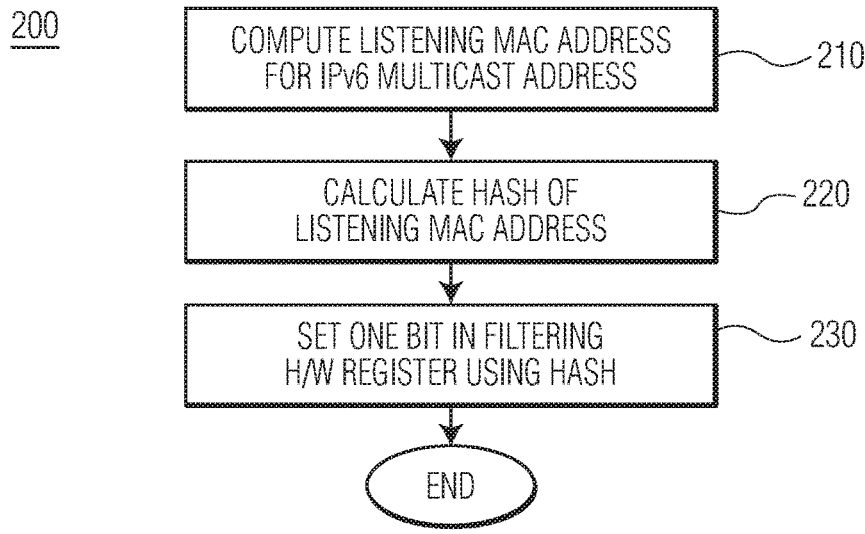
FIG. 2 is a simplified flow diagram 200 illustrating one example of a setup of hardware filter registers to listen for an IPv6 multicast address as typically used.

FIG. 2 is a simplified flow diagram 200 illustrating one example of a setup of hardware filter registers to listen for an IPv6 multicast address as typically used. Initially, a listening MAC address is computed for the IPv6 multicast address (210). In IPv6, the first two bytes of the listening MAC address are 33:33, while the last four bytes are the last four bytes of the IPv6 multicast address. Next, a hash is calculated of the listening MAC address (220). In one example, such a calculation is performed using a 32-bit cyclic redundancy check (CRC32). Finally, one bit is set in the filtering hardware register using the hash (230). Depending on the number and size of the filtering registers, a subset of the hash is used for setting one bit in the hardware registers. For 2×32-bit registers, only the last six bits of the hash are used. For example, bit 27 selects one of the two registers, and bits 27-32 are used to select and set one bit from the selected register. In a situation where there are many multicast addresses, multiple different multicast addresses may set the same bit in the filtering register.

Figure 3:
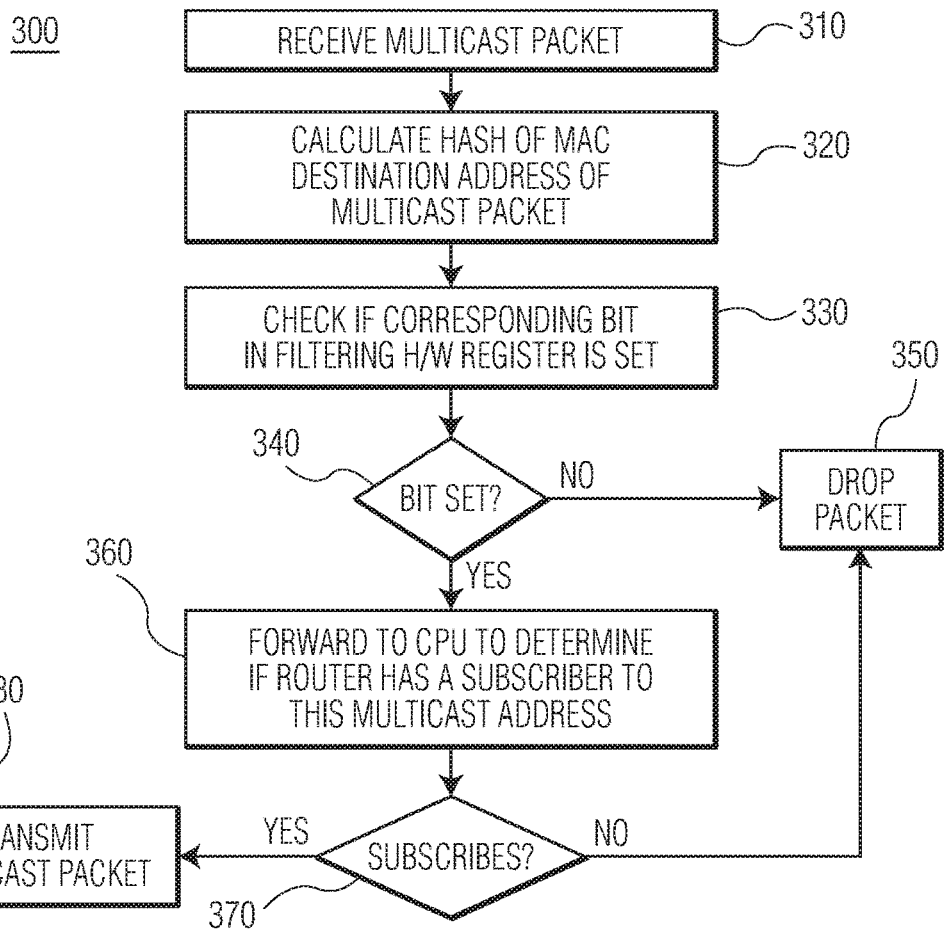
FIG. 3 is a simplified flow diagram 300 illustrating an example of a filtering process performed when a multicast packet is received, as used in conjunction with the filter register setting method illustrated in FIG. 2.

FIG. 3 is a simplified flow diagram 300 illustrating an example of a filtering process performed when a multicast packet is received, as used in conjunction with the filter register setting method illustrated in FIG. 2. When a multicast packet is received by a router node (310), a hash of the destination MAC address of the multicast packet is calculated (320). A check is then performed to determine if a bit corresponding to the hash of the destination MAC address is set in the filtering hardware register (330). As with setting the registers in the discussion associated with FIG. 2, a subset from the hash value is used depending on the number and size of the filtering registers. Using a similar example to that above, for 2×32-bit registers, the last six bits of the hash value are used: bit 27 selects one of the two registers, and bits 27-32 select one bit from the selected register. If the corresponding bit in the register is not set (340), then the packet is dropped at the hardware level (350). If the corresponding bit is set (340), then the packet is forwarded to the router processor to determine if the router has a subscriber to this multicast address (360). If there is not a subscriber (370), then the packet is dropped (350). If there is a subscriber (370), then the multicast packet is transmitted to nodes within the network associated with the router (380).

As discussed above, if there is a high volume of multicast traffic in the network that passes the hardware filter but is not addressed to the router (or nodes within the network associated with the router), many processor cycles can be consumed at this step. Such a scenario is likely in a Thread 1.2 network, where multiple Thread Networks are linked by the backbone link in a Thread Domain. Each device from a Thread network can configure an IPv6 Domain Unicast Address (DUA). All such DUAs must appear on-mesh, according to the Thread specification. To accomplish this, each primary backbone border router (BBR) implements ND-proxy functionality according to RFC 4861. That is, for each DUA address from its network, the BBR joins the solicited-node multicast address for that DUA. The BBR responds to neighbor solicitation (NS) messages received on the backbone link in the name of proxied nodes associated with the BBR. Each BBR therefore acts as an ND-proxy for each IPv6 DUA from the BBR's corresponding Thread network. As an example of the magnitude of the issue, a Thread network may have up to 16,000 devices where each device has a configured IPv6 DUA.

In order to address this issue, embodiments of the present invention selectively allocate IPv6 DUAs on proxied nodes such that solicited node multicast addresses for all the DUA's of a specified Thread network will set a single bit from the hardware multicast register of the ND-proxy device that the DUA belongs to. DUA addresses are typically configured using one of two methods: Dynamic Host Configuration Protocol (DHCP) or Stateless Address Autoconfiguration (SLAAC). In a DHCP-governed network, rather than randomly allocating DUA's on proxied nodes, which wastes hardware filtering space as shown above, a DHCP server will allocate IPv6 address pools per each Thread Network. In a SLAAC governed network, the mechanism for generating the DUA interface identifier is configured to take into consideration the Thread subnetwork with which the DUA is associated.

DHCP is a network management protocol in which a DHCP server dynamically assigns an IP address and other network configuration parameters for each device on a network so that those devices can communicate with other IP networks. A DHCP server enables computers to request IP addresses and networking parameters automatically, thereby reducing the need for a network administrator or a user to manually assign IP addresses to all network devices. Within a local network, the DHCP server assigns a local IP address to each device connected to the network. As illustrated in FIG. 1, a DHCP server can be coupled to the Thread Networks 110, 113, and 116 via backbone link 120 and could be one of network nodes 127.

For allocation of IP addresses associated with a Thread 1.2 network, DHCP-related embodiments of the present invention rely, in part, upon a portion of the Thread specification that requires each Thread Network to have a Thread Network Name that is unique within a Thread Domain. Thread clients initiating a DHCP discovery process will include a network identifier in the options field of the DHCP Discovery message so that the DHCP server can determine which IPv6 address to assign to the requesting Thread client, as will be discussed in greater detail below.

In configuring a DHCP server to perform embodiments of the present invention, additional network parameters should be provided to the server. Such parameters include:
  mcast_hash_size (size of filtering hash of a BBR): as discussed above, this is the number of bits in the hardware hash registers of the backbone border routers of the Thread network. For example, mcast_hash_size=64 for a BBR having 2×32 bit registers. In a situation where BBRs in a Thread 1.2 network have different sizes of the hardware multicast filtering registers, then the mcast_hash_size is taken from the BBR with the highest filtering capabilities (i.e., the largest size of the hardware filtering registers). By choosing the maximum value of mcast_hash_size, the hashes of the multicast addresses can be distributed evenly in a range of 1:mcast_hash_size, and all of the entries from the hardware registers can be used.
  number_of_nwks: this is a number of Thread Networks linked on a backbone link through BBRs.
  pool_size [optional/default value]: this is the DHCP address pool size, which is a minimum value for a number of precomputed IPv6 DUA addresses for each Thread Network. The value for this parameter is chosen depending on DHCP server processing capabilities, as this parameter can affect the length of time taken to initialize address pools by the DHCP server.

max_pool_size: each DHCP address pool associated with a Thread Network can have a maximum value for a number of precomputed DUA addresses. The value for this parameter should also be chosen depending on DHCP server processing capabilities.

When a DHCP server initializes, the DHCP server will configure number_of_nwks DHCP address pools, where each pool is configured with at least pool_size DUAs, up to max_pool_size. The DHCP server will configure additional parameters associated with each DHCP address pool during this process:

pool_hash: pool hash has a starting value of 0, which will be allocated to the first DHCP address pool. Each time a new pool is generated, pool_hash value gets incremented and the incremented value is associated with the new pool.

pool_hash_bits: the size of pool_hash is expressed in bits and depends on the value of mcast_hash_size (e.g., $2^{pool\_hash\_bits}$=mcast_hash_size [for selecting all 64 bits of 2×32 multicast hash registers, six bits are needed]).

thread_network_id: this is the Thread Network Name or other identifier associated with the Thread Network served by the DHCP address pool. Initially, the value for this parameter will be −1, and will be modified when the DHCP address pool is associated with a particular Thread Network.

Figure 4:
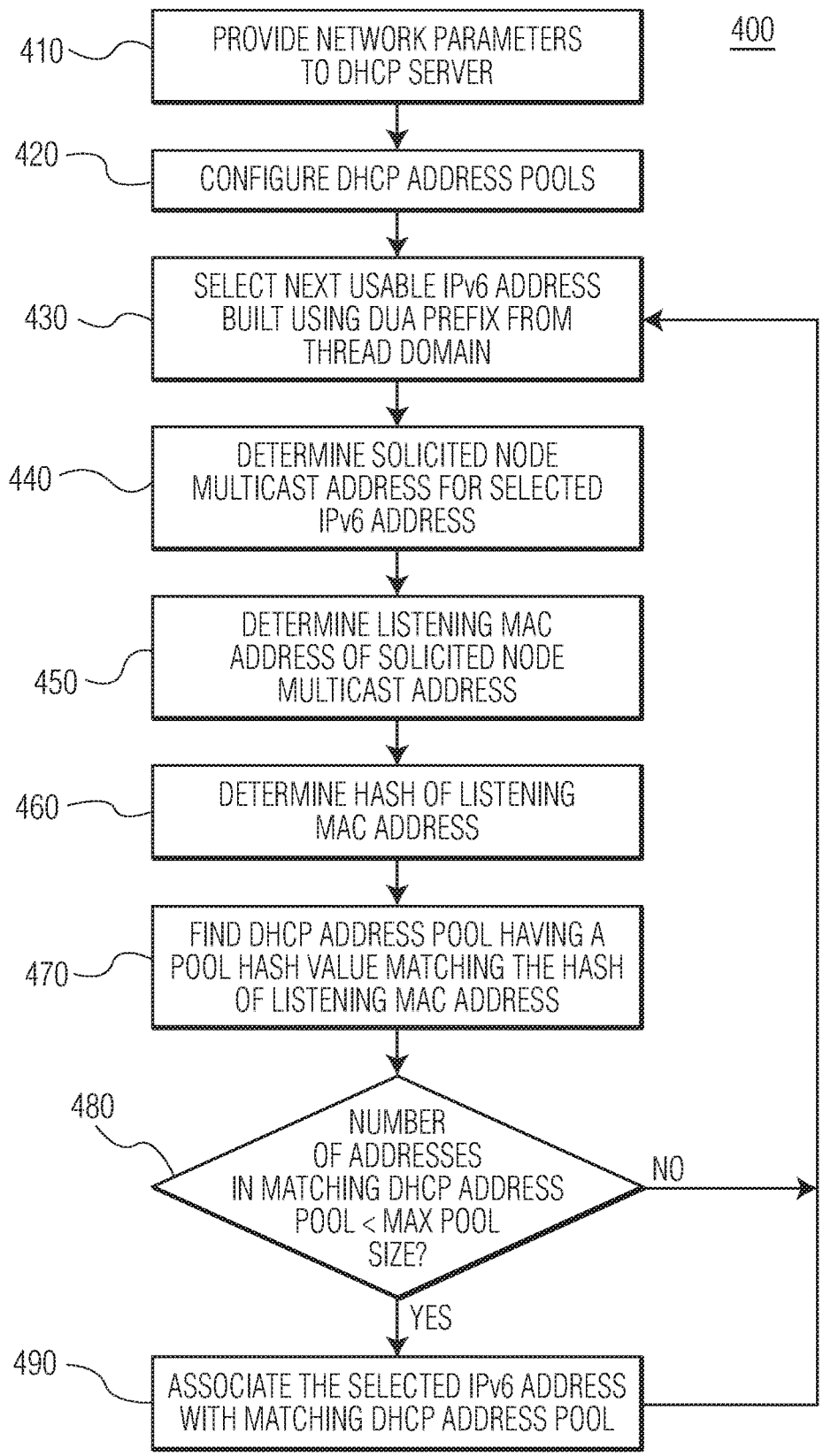
FIG. 4 is a simplified flow diagram illustrating a DHCP address pool population flow 400, in accord with an embodiment of the present invention.

FIG. 4 is a simplified flow diagram illustrating a DHCP address pool population flow 400, in accord with an embodiment of the present invention. As discussed above, network parameters related to the Thread Network are provided to the associated DHCP server (410). Then, the DHCP address pools are configured utilizing the network parameters and additionally generated parameters associated with DHCP address pools (420). Once the DHCP address pools are configured, the DHCP server begins a process of allocating IPv6 addresses associated with the Thread 1.2 network to each of the available DHCP address pools. A goal of this process is to ensure that all DUA's in the same DHCP address pool will set the same bit in a hardware multicast filtering register of a backbone border router. In other words, each BBR will be allocated a bit and all DUA's associated with the BBR will have a multicast address that generates that bit after hashing.

The DHCP address pools are populated by going through available candidate IPv6 addresses and allocating those addresses appropriately to each DHCP address pool. A next usable IPv6 address is selected to determine address pool allocation (430). The IPv6 address is built using a DUA prefix of the Thread Domain. A solicited-node multicast address is then determined for the selected IPv6 address (440). Typically, a solicited-node multicast address is created by taking the last 24-bits of the selected IPv6 address and appending those bits to a prefix ff02::1:ff00:0/104. A Listening MAC address of the solicited-node multicast address is then determined (450). As discussed above, the Listening MAC address has the first two bytes being 33:33, and the last four bytes being the last four bytes of the solicited-node multicast address. A hash is then determined of the Listening MAC address (460).

Once the hash is determined for the Listening MAC address, the DHCP server finds a DHCP address pool that has a pool hash value that matches the hash of the Listening MAC address (470). If a number of addresses in the matching DHCP address pool is less than the maximum pool size (480), then the selected IPv6 address is associated with the matching DHCP address pool (490) and the process continues with a next selected usable IPv6 address (430). If the number of addresses in the matching DHCP address pool is greater than the maximum pool size, then the process continues with a next selected usable IPv6 address (430). This process continues until all the DHCP address pools (number_of_nwks) have been allocated max_pool_size addresses.

Figure 5:
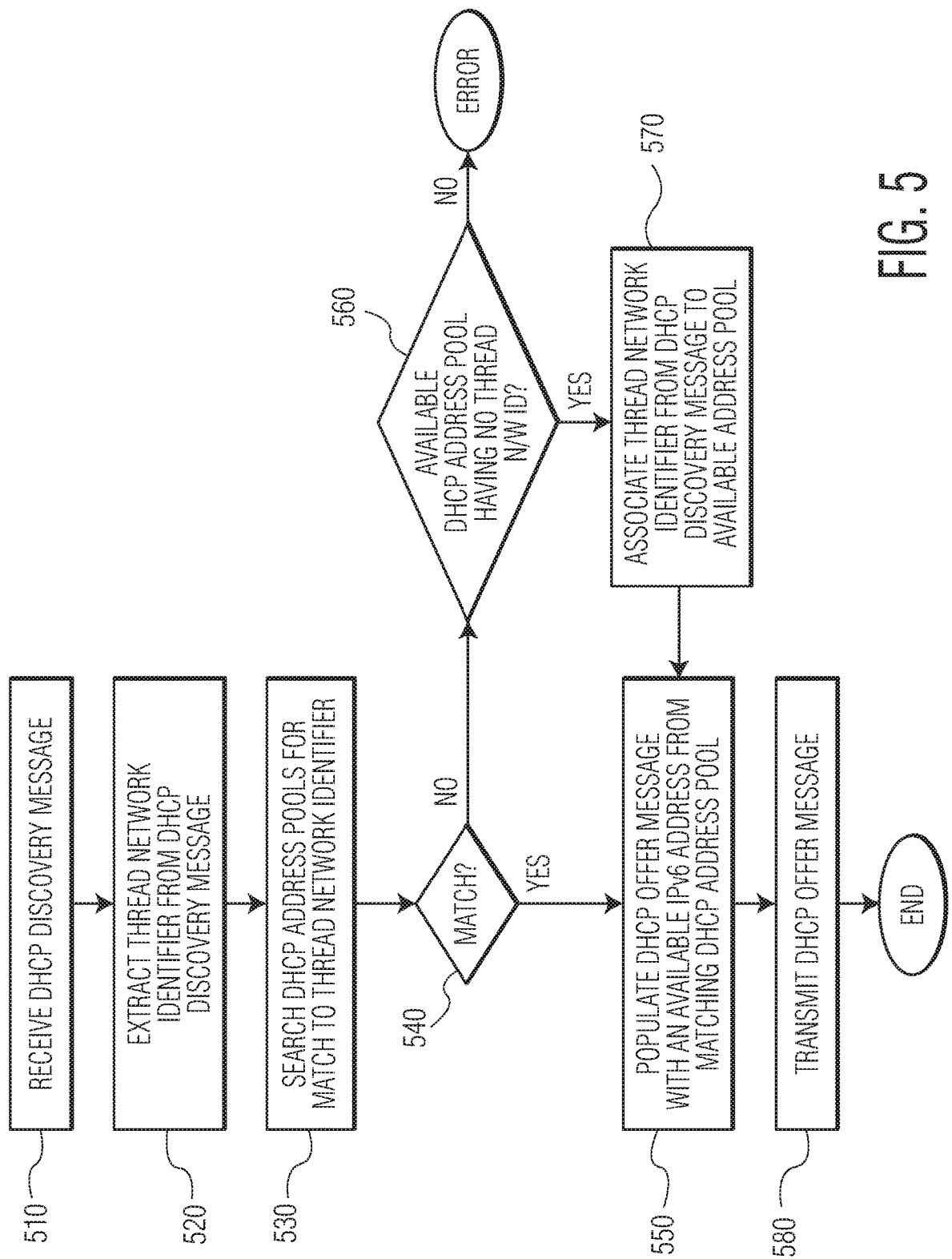
FIG. 5 is a simplified flow diagram illustrating a DHCP address distribution flow 500, in accord with an embodiment of the present invention.

FIG. 5 is a simplified flow diagram illustrating a DHCP address distribution flow 500, in accord with an embodiment of the present invention. Once the DHCP server and the DHCP address pools are configured, the DHCP server can be used to allocate the pool associated IPv6 addresses to requesting nodes. When a DHCP client initializes, it broadcasts a DHCP Discovery message to request an IP address. As discussed above, a Thread node must include a network identifier in the DHCP Discovery message options field.

The DHCP server receives the DHCP Discovery message (510) and extracts the Thread network identifier from the DHCP Discovery message (520). The DHCP server can then search the set of configured DHCP address pools for a match to the Thread network identifier (530). If a DHCP address pool is already configured with a match to the Thread network identifier (540), then the DHCP server can populate a DHCP offer message with an available IPv6 address from the matching DHCP address pool (550), and that DHCP offer message can be transmitted to the requesting DHCP client (580). If there is no DHCP address pool associated with a match to the thread network identifier (540), a determination is made as to whether there is an available DHCP address pool having no thread network identifier (560). If there is an available DHCP address pool, then the thread network identifier from the DHCP Discovery message is allocated to the available address pool (570). Subsequently, as above, a DHCP offer message is populated with an available IPv6 address and transmitted to the requesting DHCP client. If there is no available DHCP address pool (560), this constitutes an error condition, which will be handled in a manner appropriate to the network configuration.

In the manner described above, the DHCP server ensures that all the IPv6 addresses assigned to a Thread Network will set the same bit in the multicast hardware filter registers. This allows for more efficient hardware filtering of multicast traffic between the networks on the same backbone link.

Networks utilizing stateless address autoconfiguration (SLAAC) can also be configured to utilize embodiments of the present invention. In SLAAC networks, a DUA address includes a DUA prefix of the Thread Domain and a DUA interface identifier (IID). In order to configure a SLAAC network to utilize embodiments of the present invention, Thread nodes are made aware of the multicast hardware capabilities of the associated ND-proxy backbone border router so that a hash resulting from a node SLAAC-configured IID will set an appropriate bit in a multicast hardware filter of the associated ND-proxy BBR. Aspects of embodiments of the present invention are included during both backbone border router synchronization and during address generation.

A goal during backbone border router synchronization is for each BBR to determine which bit or a subset of bits in the hardware multicast filter are to be associated with the BBR. Initially, each BBR determines its own multicast hardware capabilities by, for example, reading these capabilities directly from the BBR's registers. Specifically, a value for a number of bits available for multicast hardware filtering is needed (e.g., mcast_hash_size). For example, a system that has 2×32 bits in the hardware filter registers will have a value for mcast_hash_size of 64. By the end of the backbone border router synchronization process, each BBR will decide on a network hash value (network hash) defining the hash value for the associated Thread Network and incremented for each Thread Network, and a size of the network hash (network_hash_bits) that depends on the multicast hash size (e.g., $2^{pool\_hash\_bits}$=mcast_hash_size [for selecting all 64 bits of 2×32 multicast hash registers, six bits are needed]).

Figure 6:
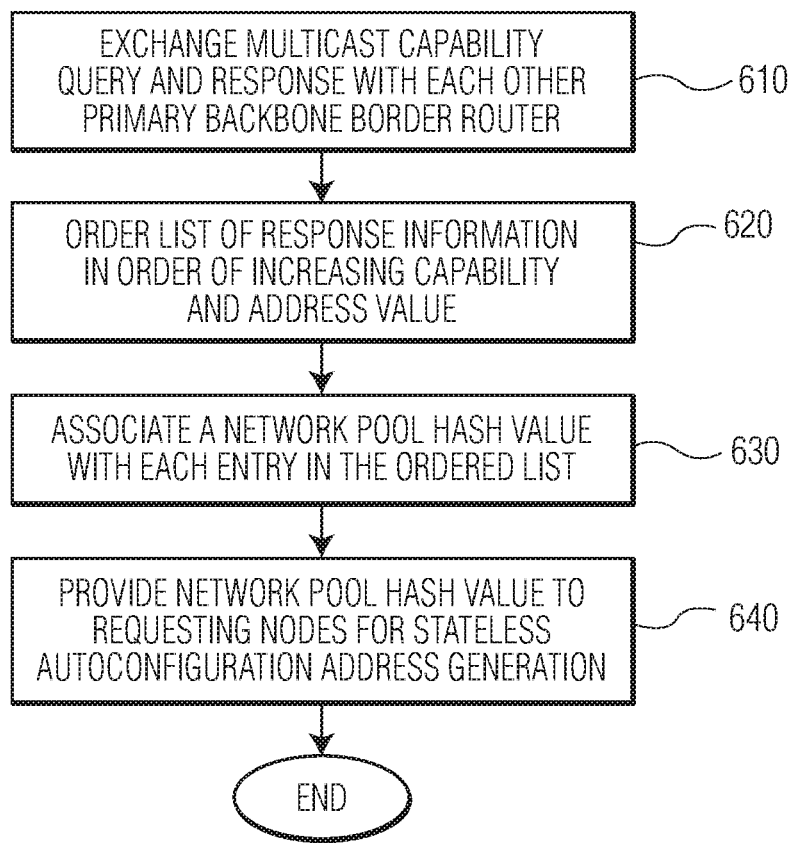
FIG. 6 is a simplified flow diagram illustrating one example of a backbone border router synchronization process in accord with one embodiment of the present invention.

FIG. 6 is a simplified flow diagram illustrating one example of a backbone border router synchronization process in accord with one embodiment of the present invention. As an initial step, the primary BBRs exchange multicast capability information with one another through a query and response process (610). Embodiments provide two new messages to provide the multicast capability information. One is a query message for the multicast capability information (e.g., BB.qry_mcast_capab). This message can be a Constrained Application Protocol (CoAP) formatted message to all other primary BBRs on a backbone link. The destination address for the message can be the IPv6 All Nodes Address (e.g., FF01:0:0:0:0:0:0:1) so that all the BBRs will receive the message. Only primary BBRs are required to respond to the message, since the secondary BBRs are backups to the primary BBRs in a Thread Network. The second new message is a response to the query, providing the multicast capability information (e.g., BB.ans_mcast_capab). This can be a link-local message sent by a responding primary BBR to the requesting BBR. The payload for the answer includes the mcast_hash_size of the responding primary BBR.

Once each of the primary BBRs has responded to a query message, the querying BBR will have an indexed list that includes identifying information regarding each responding router, the corresponding mcast_hash_size for that router, and a link-local address for that router. The list will also include information about the BBR itself. This indexed list will then be placed in an order of increasing capability and address value (620). For example, the list will be ordered first in increasing mcast_hash_size value order. Then where there are multiple primary BBRs with the same mcast_hash_size value, the link-local address will be placed in increasing order for that mcast_hash_size. Ordering in this manner ensures that each BBR has a list with the same order.

Once the list is ordered, the BBR associates a network pool hash value (e.g., network_hash) with each index of the ordered list (630). In one embodiment, the starting value for network_hash will be 0 and each index will receive an incremented network_hash value. Ordering the network pool hash values in this manner ensures that each BBR selects different values for the network_hash while properly using all the multicast entries in case BBRs with different sizes of the multicast filtering registers are used. Once the network_hash value is determined for the BBRs, this value will be provided to any requesting node during the SLAAC address generation process for that node (640). Requesting nodes (e.g., a Thread 1.1 MTD or FTD) can query for the network_hash value using, for example, a CoAP formatted, vendor-specific message to the BBR. If there is a reply to the CoAP query, then the ND-proxy BBR supports an embodiment of the present invention and the requesting node will use the modified SLAAC address generation process below. Otherwise, the requesting node will use a standard SLAAC address generation process.

Figure 7:
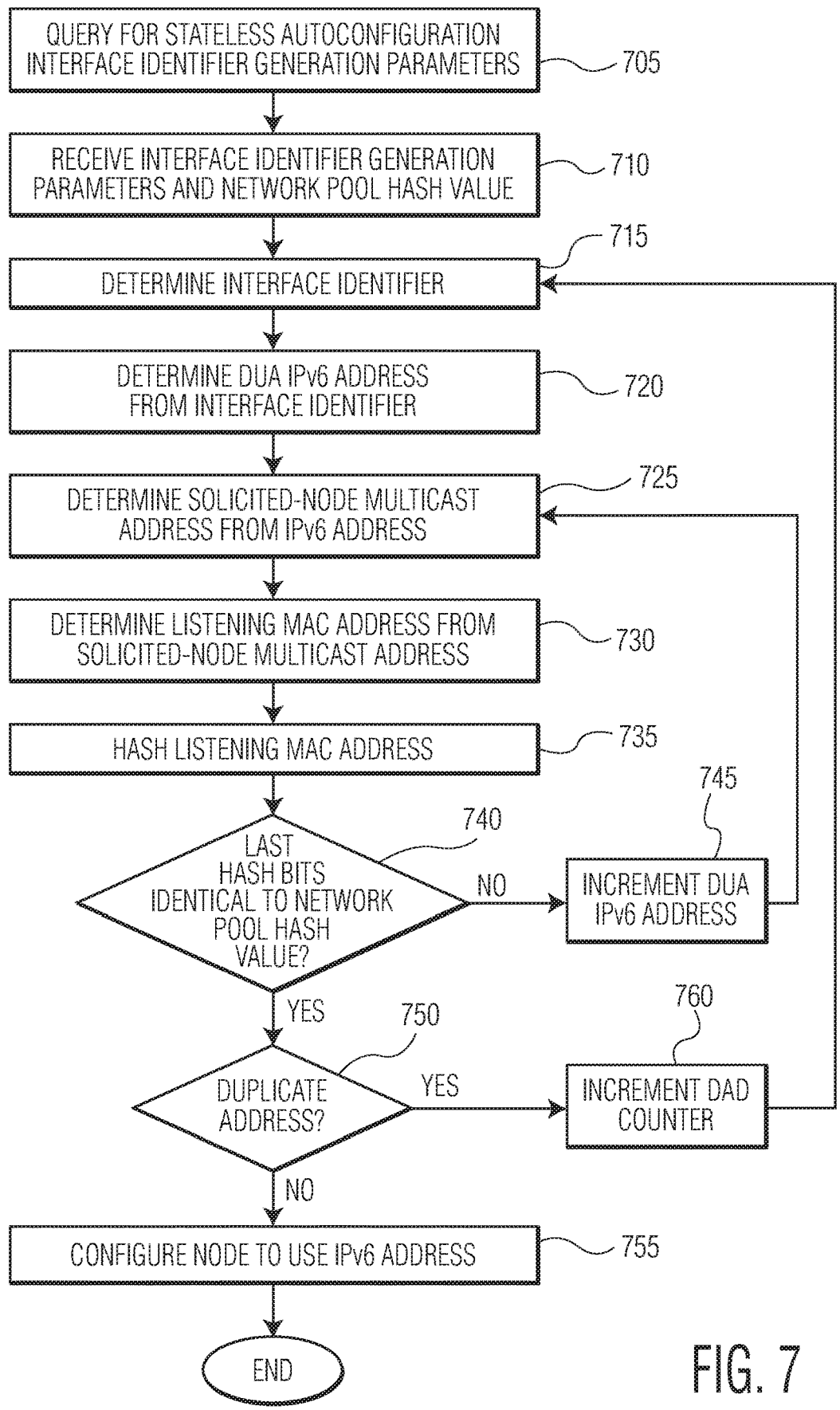
FIG. 7 is a simplified flow diagram illustrating a modified SLAAC address generation process 700 to provide addresses having a specific multicast hash value, in accord with embodiments of the present invention.

FIG. 7 is a simplified flow diagram illustrating a modified SLAAC address generation process 700 to provide addresses having a specific multicast hash value, in accord with embodiments of the present invention. SLAAC includes a default interface identifier generation scheme that is used to configure a stable IPv6 address for nodes within a subnet. The scheme utilizes a network prefix advertised by a local router and an interface identifier that embeds a hardware address. The algorithm, as provided in RFC 7217, includes a pseudorandom function to generate the interface identifier. The prefix is learned from either an ICMPv6 Router Advertisement message or a link-local IPv6 unicast prefix. The function also requires an implementation-dependent stable identifier associated with a network interface for which the interface identifier is being generated. Also, a network ID is provided to the function which identifies the subnet to which the interface is attached. In addition, in order to resolve duplicate address calculations, a Duplicate Address Detection (DAD) counter is included to increment for each new tentative address that is configured.

In one embodiment of the present invention, the default SLAAC interface identifier scheme is modified to first check if a hash (e.g., CRC32) generated from the address will set a bit in the multicast hardware register associated with the Thread Network. If the desired bit is not set, then the address will be incremented while checking the hash value. Since the hash values are evenly distributed among the networks, it takes at most mcast_hash_size increment iterations for finding an address that will pass the hash value check. If then a duplicate address is detected, then the DAD counter is incremented, and the default algorithm will be used to generate a new DUA candidate.

Referring back to FIG. 7, a network node (e.g., a Thread FTD or MTD) queries a BBR for SLAAC interface identifier generation parameters used by the pseudorandom function discussed above (705). The parameters are provided by a BBR associated with the subnetwork that includes the requesting node (e.g., a Thread Network) (710). In addition, the BBR also provides the network pool hash value associated with the BBR, as allocated by the process illustrated in FIG. 6. The provided parameters can include the prefix and the network ID. The interface identifier is determined using the SLAAC process discussed above as developed in RFC 7217 (715). A DUA IPv6 address is then determined for the calculated interface identifier, using the prefix in conjunction with the interface identifier (720).

Subsequent to the determination of the IPv6 address, a solicited-node multicast address is determined for the node (725). As discussed above with regard to the DHCP scenario, the solicited-node multicast address can be created by taking the last 24-bits of the IPv6 address and appending those bits to a prefix of ff02::1:ff00:0/104. A Listening MAC address of the solicited-node multicast address is then determined (730). The Listening MAC address has the first two bytes being 33:33 and the last four bytes being the last four bytes of the solicited-node multicast address. A hash is then calculated of the Listening MAC address (735).

Once the hash is calculated for the Listening MAC address, the node determines whether the last hash bits match the network pool hash value received from the BBR (740). If the hash bits do not match the network hash value, then the IPv6 address is incremented by one (745) and the process resumes by determining a solicited-node multicast address for the new IPv6 address (725). The process continues until a match for the network hash value is found. Once an IPv6 address having a match to the network hash value is determined, the node then communicates with the BBR to determine whether the IPv6 address is already assigned within the Thread Network (750). If the address has already been assigned, then the DAD counter is incremented (760) and a new SLAAC interface identifier is calculated returning to 715 and repeating the process. Once an unassigned address that matches the network hash value is determined, the node is configured to use the IPv6 address as a member of the Thread Network (755).

One drawback to the above approach for determining addresses using modified SLAAC techniques is that the probability for duplicate address generation is increased over the standard SLAAC process. For example, using the default SLAAC address generation algorithm suggested in RFC 7217 with a SHA1 cryptographic hash algorithm as the pseudorandom function F( ), a probability of generating a duplicate address is:

$$p \leq \frac{n(n-1)}{2} \times \frac{1}{2^b}$$

where n is the total number of Thread nodes from all the Thread Networks and b is the number of bits in the DUA interface identifier. Thus, the probability of having a DUA collision is bounded by the number of pairs of Thread nodes multiplied by the probability that a given pair will collide.

Using the mechanism for determining a DUA address discussed with respect to FIG. 7, the probability of generating a duplicate address becomes:

$$p \leq \frac{n(n-1)}{2} \times \frac{1}{2^{b-network\_hash\_bits}} \times \left( \frac{2^{network\_hash\_bits} - number\_of\_nwks}{2^{network\_hash\_bits}} \right)$$

where "number_of_nwks" is the number of Thread networks (e.g., number of primary BBRs on the backbone link). Thus, the probability that a given pair will collide is the probability that the first "b-network_hash_bits" bits of the generated interface identifier will be the same multiplied with the probability that the last network_hash_bits of the generated interface identifier will set the same bit in the hardware multicast filter.

While this higher probability of a duplicate IPv6 address being generated may increase the time for a node to be initially configured into a network, this is offset by a significant reduction in CPU usage in BBRs during multicast filtering.

Figure 8:
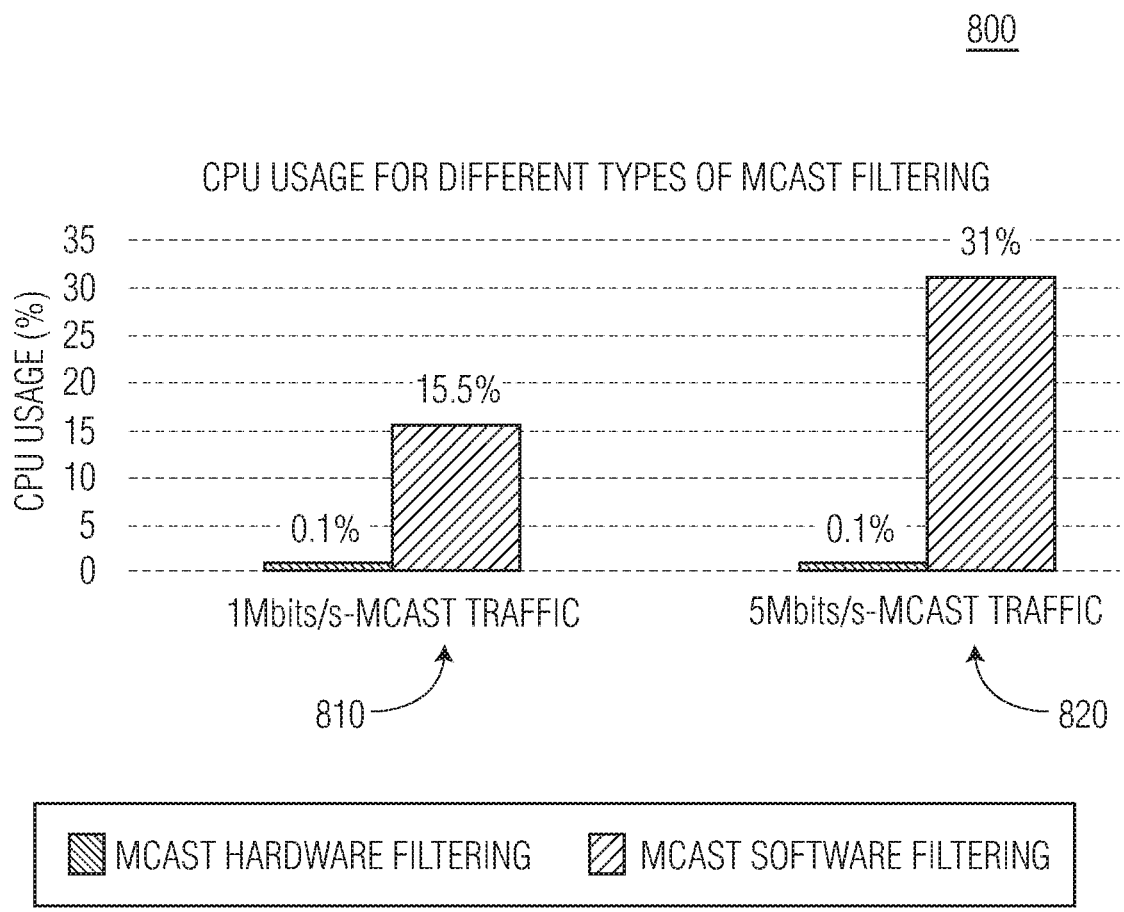
FIG. 8 is a bar graph illustrating differences in CPU usage for BBRs where a hardware multicast filtering configuration of embodiments of the present invention is used and where software filtering of prior art devices is used.

FIG. 8 is a bar graph illustrating differences in CPU usage for BBRs where a hardware multicast filtering configuration of embodiments of the present invention is used and where software filtering of prior art devices is used. In graph 810, 1 Mbit/sec of multicast traffic was generated between two hosts connected on a backbone link. Traffic was not addressed to the target device. Where multicast filtering was performed in software as in prior art devices, CPU usage was 15.5%. In a device in which an embodiment of the present invention was performed to configure addresses assignment, CPU load was very low (approximately 0.1%), due to all multicast filtering being resolved after hardware filter check. Similarly, in graph 820, where 5 Mbit/sec of multicast traffic was generated, CPU usage was 31% for a device using software multicast filtering and 0.1% for a device in which an embodiment of the present invention was performed to configure address assignment. This represents a significant improvement in performance of routers by reducing consumption of resources to perform multicast filtering, while at the same time utilizing a fast, hardware only approach to filtering.

Figure 9:
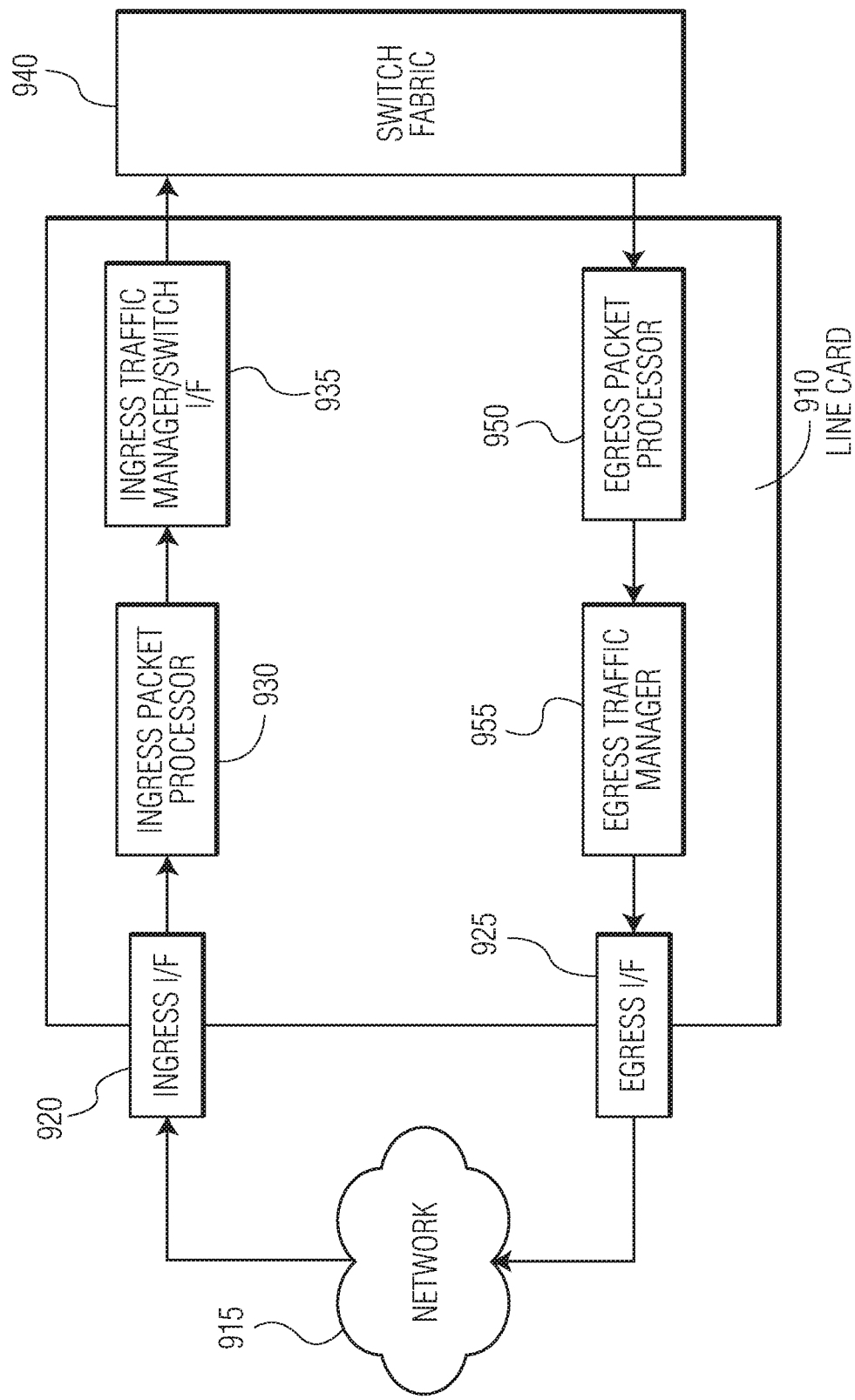
FIG. 9 is a simplified block diagram illustrating a network routing device 900 configurable to incorporate embodiments of the present invention.

FIG. 9 is a simplified block diagram illustrating a network routing device 900 configurable to incorporate embodiments of the present invention. Network routing device 900 includes a set of line cards 910 and a switch fabric 940. Each line card 910 includes one or more ingress interfaces 920 and one or more egress interfaces 925. As will be understood, the ingress interfaces and the egress interfaces can be implemented in shared circuitry such as a shared port adapter, which include one or more physical interfaces to a network 915 and are configured to perform operations on ingress and egress frames, such as OSI Layer 2.

Ingress interface 920 provides incoming packets to ingress packet processor 930. The ingress packet processor can be a multi-processing, multi-pipelined processor configured to perform a series of operations on incoming packets, such as a multi-core processor. The ingress packet processor can perform analysis of incoming packet headers and support edge features such as classification and flow statistics based upon information in headers. The ingress packet processor can perform analysis on protocols such as IPv4, IPv6, and MPLS packets. Such protocol processing can include the processing associated with routing and hash tables described above, wherein the routing tables can include the hybrid hash tables of embodiments of the present invention. The hash table buckets can reference single flow entries and cumulative entries that reference multiple flows in the key tables described above. Ingress Traffic Manager/Switch Interface 935 receives the processed packets from ingress packet processor 930 and can then perform packet buffering, queue management, ingress traffic shaping, and packet dropping. The ingress traffic manager/switch interface 935 can then prepare the packet for transmission through switch fabric 940 (e.g., uniform, identified cells).

Once the packets are transmitted through switch fabric 940, egress packet processor 950 reassembles the switch fabric cells into packets and performs additional protocol driven operations on the packets, include fragmenting the packets, if necessary, for the coupled network. The egress packet processor then provides the outgoing packets to egress traffic manager 955, which prepares the packets for transmission and queues the packets to egress interface 925. Egress interface 925 formats the packets appropriately for the physical network coupled to the line card and transmits the packets to network 915.

Figure 10:
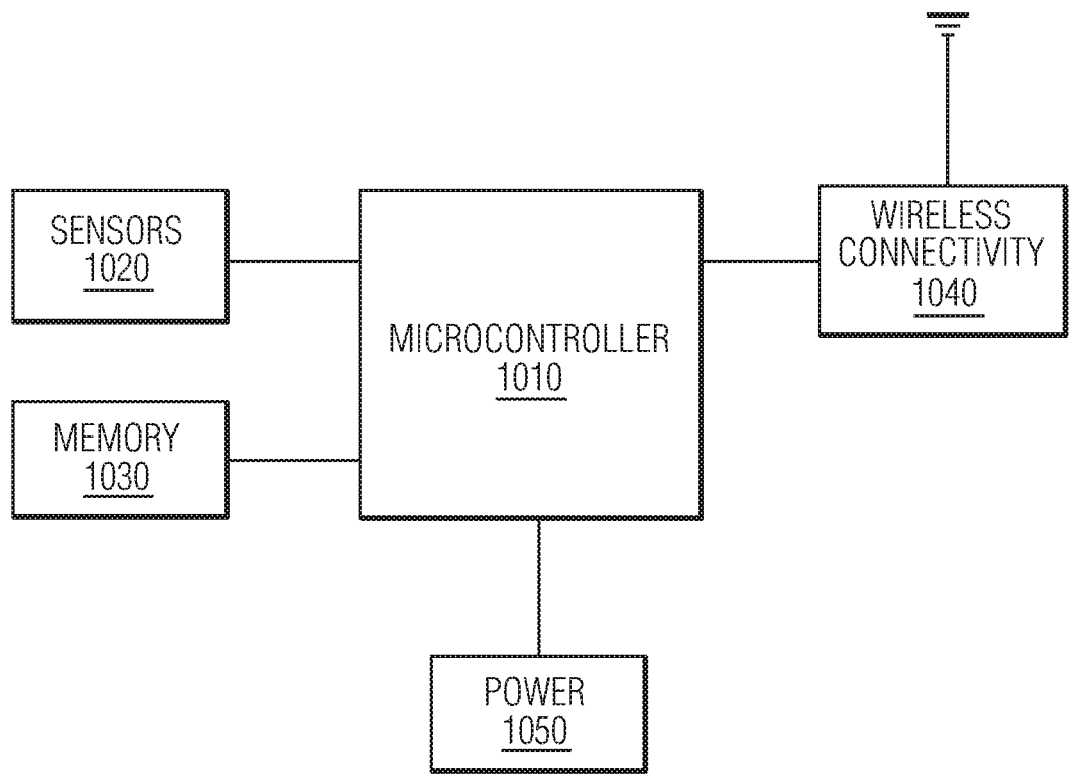
FIG. 10 is a simplified block diagram illustrating components of an example IoT sensor node 1000 that can incorporate embodiments of the present invention.

FIG. 10 is a simplified block diagram illustrating components of an example IoT sensor node 1000 that can incorporate embodiments of the present invention. IoT sensor node 1000 incorporates a microcontroller (MCU) 1010 programmed to receive data from sensors module 1020 and provide information from that data to other network nodes via wireless connectivity module 1040. MCU 1010 can be a 8-, 16-, or 32-bit MCU, for example, in which low-to-medium complexity nodes use an 8- or 16-bit MCU, while high complexity nodes use a 32-bit MCU. The choice of MCU type can be dependent upon the data throughput needs and the power constraints of the application, for example. MCUs can have sensor interfaces, voltage regulators, and RF radios on chip, or those devices can be external to the MCU.

Sensors module 1020 can include one or more of a variety of sensor types, including, for example, smart sensors, RFID or near field communication, optical sensors, image sensors, environmental sensors, and the like. Smart sensors are sensors that include data processing in the sensor. These can include, for example, environmental sensors that perform simple processing of the collected environmental data, or microelectromechanical systems (MEMS) sensors having a gyroscope and accelerometer with integrated digital processing for sensor fusion calculations. RFID or near field communication sensors can be configured to detect the presence of items identified with a RFID or NFC tag. Optical sensors are used to detect the presence of light in either visible or non-visible wavelengths. Image sensors are light sensitive sensor arrays (e.g., CCD) that translate an image into electrical signals. An environmental sensor is configured to detect the status of the environment around the sensor. Such information can include, for example, pressure, temperature, position, acceleration, motion, or orientation. Sensors in sensor module 520 can provide a digital output that is read by MCU 1010.

In addition, sensors module 1020 can include inputs for systems that provide an analog signal. In such cases, sensors module 1020 can include an analog-to-digital converter (ADC), especially when a high speed or precision conversion is required by the application. Alternatively, in applications where an ADC is insufficient, sensors module 1020 can include an analog front end that includes an ADC and signal conditioning circuitry to provide the digital signal to the MCU.

Memory module 1030 can provide storage access to MCU 1010 over and above the memory on board the MCU. For example, memory module 1030 can include RAM or flash or removable memory to store programs for the MCU or other data.

Wireless connectivity module 1040 is configured to provide communication between the IoT sensor node and other nodes in the network (e.g., a parent node or a child node). As discussed above, embodiments of the present invention can be used in a wireless mesh network such as that defined by IEEE 802.15.4. Such networks are typically used for low data rate, battery powered nodes distributed over a wide area. The wireless connectivity module can be configured to transmit and receive data with one or more other nodes in the network.

Power module 1050 provides the correct voltage to MCU 1010 and also manages the battery to help increase battery life and ensure that proper charging current and voltage is applied. Power module 1050 can also include low loss voltage regulators and step up/step down voltage converters to help ensure that the IoT sensor node is operating at the correct voltage.

As discussed above, embodiments of the present invention provide a mechanism by which a hardware filter on border routers of WPANs is not overloaded by increasing the probability that the hardware filter will capture all the nodes not on the corresponding WPAN. Network addresses for nodes within a subnet are allocated to have the same multicast address hash value in order to permit router multicast filtering to occur within hardware. Hardware filtering thereby relieves the router processor from performing filtering tasks, reducing resource consumption and decreasing the time used to perform filtering. Embodiments provide this functionality by assigning a unique multicast filter register value to each subnet within a network and allocating network addresses associated with that multicast filter register value through either DHCP or SLAAC address generation.

By now it should be appreciated that there has been provided a network routing device that includes a first network interface coupled to a network subnet, a second network interface coupled to a network external to the subnet, one or more registers configured for filtering based on a multicast address hash where the one or more registers store a bit value assigned to the network routing device and the bit value is selected using a pool hash value associated with the network routing device, and a processor. The network routing device is configured to control external network traffic to the subnet and perform neighbor discovery proxy tasks for a plurality of nodes in the subnet. Each of the plurality of nodes in the subnet has a unique network address and each of the unique network addresses is determined using the pool hash value assigned to the network routing device.

In one aspect of the above embodiment, the network external to the subnet includes a plurality of other network routing devices where each other network routing device is configured to perform ND-proxy tasks for a plurality of nodes in a subnet associated with that network routing device. Further, the network routing device is configured to transmit a multicast capability query with each other network routing device, receive information regarding multicast capability of each other network routing device, create a list including the information regarding multicast capability of each other network routing device and the network routing device where the list is primarily in order of increasing multicast capability and secondarily in order of increasing address value for entries having the same multicast capability, and associate a pool hash value with each entry of the ordered list.

In a further aspect, the network routing device is configured to respond to a SLAAC request for information from a requesting node in the plurality of nodes in the subset, and provide the pool hash value associated with the network routing device to the requesting node. In yet a further aspect, the network routing device is configured to respond to a SLAAC message from the requesting node in the plurality of nodes in the subset. The SLAAC message includes a request to check whether a network address generated by the requesting node is a duplicate of a previously assigned network address, and the network address generated by the requesting node is generated using the pool hash value.

In another aspect of the above embodiment, the network subset and the subnets associated with each other network routing device are Thread Networks.

In another aspect of the above embodiment, the network external to the subnet includes a plurality of other network routing devices, each other network routing device is configured to perform ND-proxy tasks for a plurality of nodes in the subnet associated with that network routing device, the network external to the subnet includes a dynamic host configuration protocol (DHCP) server, and the network routing device is further configured to receive the unique network addresses from the DHCP server where each of the unique network addresses are members of an address pool generated by the DHCP server using the pool hash value. In a further aspect, the network routing device is configured to transmit a DHCP discovery message to the DHCP server on behalf of a requesting node in the network subnet where the DHCP discovery message includes an identifier of the network subnet, and receive a DHCP offer message from the DHCP server in response to the DHCP discovery message. The DHCP offer message includes a network address for the requesting node and the network addresses selected by the DHCP server from the address pool using the identifier of the network subnet. In yet a further aspect, the network subnet and the subnets associated with each other routing device are Thread Networks.

Another embodiment of the present invention provides a network node configured to perform SLAAC in a network subnet having a ND-proxy border router. The network node includes a network interface coupled to the network subnet and a processor. The network node is configured to: determine an IPv6 domain unicast address (DUA) from a calculated interface identifier for the network interface; determine a listening MAC address using the IPv6 DUA; perform a hash calculation on the listening MAC address; and use the IPv6 DUA if the last hash bits of the hash calculation on the listening MAC address are the same as a network hash value and the IPv6 address is not a duplicate of another node on the network subnet.

In one aspect of the above embodiment, the network node is further configured to query the ND-proxy border router for SLAAC interface identifier generation parameters, and receive, in response to the query, the SLAAC interface identifier generation parameters and the network hash value. In a further aspect, the network node is configured to calculate the interface identifier using the SLAAC interface identifier generation parameters. In another further aspect, the network hash value is a unique value for the network subnet.

In another aspect of the above embodiment, the network node is further configured to determine a solicited-note multicast address from the IPv6 DUA. The solicited-note multicast address includes the last 24-bits of the IPv6 DUA, and the listening MAC address is determined using the solicited-node multicast address. In a further aspect, the listening MAC address includes the last four bytes of the solicited-node multicast address as the last four bytes of the listening MAC address, and the first two bytes are 33:33. In another aspect of the above embodiment, the hash calculation is a 32-bit cyclic redundancy check hash.

Another embodiment of the present invention provides a method performed by a network routing device configured to perform ND-proxy tasks for a plurality of nodes in a subnet coupled to the network routing device. The method includes hashing a multicast address received in a multicast message, comparing a bit value selected using the hashed multicast address to a bit value stored in a hardware register selected using a local pool hash value, and filtering the multicast message based on said comparing. The filtering includes dropping the multicast message if said comparing does not result in a match and transmitting the multicast message to nodes in the subnet if said comparing results in a match. Each of the plurality of nodes in the subnet have a unique network address and each of the unique network addresses is determined using the local pool hash value.

In one aspect of the above embodiment, the method further includes: transmitting a multicast capability query message to one or more other network routing devices coupled to a network external to the subnet where each other network routing devices configured to perform ND-routing tasks for one or more nodes in subnets associated with each of the other network routing devices; receiving information regarding multicast capability of each other network routing device; creating a list including the information regarding multicast capability of each other network routing device and the network routing device where the list is primarily in order of increasing multicast capability and secondarily in order of increasing address value for entries having the same multicast capability; and, associating a pool hash value with each entry of the ordered list where the local pool hash value is one of the values in the ordered list. In a further aspect, the multicast capability received from each other network routing device includes a number of bits available for multicast hardware filtering on each of the other network routing devices.

In another further aspect, the method includes responding to a SLAAC request for information from a requesting node in the plurality of nodes in the subnet and providing the pool hash value associated with the network routing device to the requesting node. In still a further aspect, the method includes responding to a SLAAC message from the requesting node in the plurality of nodes in the subnet. The SLAAC message includes a request to check whether a network address generated by the requesting node is a duplicate of a previously assigned network address, and the network address generated by the requesting node is generated using the pool hash value.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 9 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 900, for example, from computer readable media such as an internal memory or other media on other computer systems. Such computer readable media may be permanently, removably or remotely coupled to an information processing system such as system 900. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, embodiments can be utilized on networks other than Thread networks, where they involve ND-proxy nodes. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A network routing device comprising:
    a first network interface coupled to a network subnet;
    a second network interface coupled to a network external to the network subnet;
    one or more registers configured for filtering based on a multicast address hash, wherein
        the one or more registers store a bit value assigned to the network routing device,
        the bit value is selected using a pool hash value associated with the network routing device, and
        the pool hash value comprises a value identifying one of a plurality of address pools associated with the network subnet and the network external to the network subnet; and
    a processor, wherein the network routing device is configured to
        control external network traffic to the network subnet, and
        perform neighbor discovery proxy (ND-proxy) tasks for a plurality of nodes in the subnet, wherein
            ND-proxy comprises responding to a network communication destined for one or more of the plurality of nodes in the subnet,
            each of the plurality of nodes in the network subnet has a unique network address, and
            each of the unique network addresses is determined using the pool hash value assigned to the network routing device.

2. The network routing device of claim 1, wherein the network external to the network subnet comprises a plurality of other network routing devices, each other network routing device configured to perform ND-proxy tasks for a plurality of nodes in a network subnet associated with that other network routing device, the network routing device is further configured to:
    transmit a multicast capability query to each other network routing device;
    receive information regarding multicast capability from each other network routing device;
    create a list comprising the information regarding multicast capability of each other network routing device and the network routing device, wherein the list is primarily in order of increasing multicast capability and secondarily in order of increasing address value for entries having the same multicast capability;
    associate a pool hash value with each entry of the ordered list.

3. The network routing device of claim 2 wherein the network routing device is further configured to:
    respond to a stateless autoconfiguration of addresses (SLAAC) request for information from a requesting node in the plurality of nodes in the network subnet; and
    provide the pool hash value associated with the network routing device to the requesting node.

4. The network routing device of claim 3, the network routing device is further configured to:
    respond to a SLAAC message from the requesting node in the plurality of nodes in the subset, wherein the SLAAC message comprises a request to check whether a network address generated by the requesting node is a duplicate of a previously assigned network address, and the network address generated by the requesting node is generated using the pool hash value.

5. The network routing device of claim 2, wherein the network subnet and the network subnets associated with each other network routing device are Thread Networks.

6. The network routing device of claim 1, wherein the network external to the network subnet comprises a plurality of other network routing devices;

each other network routing device is configured to perform ND-proxy tasks for a plurality of nodes in the network subnet associated with that other network routing device;

the network external to the network subnet comprises a dynamic host configuration protocol (DHCP) server;

the network routing device is further configured to receive the unique network addresses from the DHCP server, wherein each of the unique network addresses are members of an address pool generated by the DHCP server using the pool hash value.

7. The network routing device of claim 6 further configured to transmit a DHCP discovery message to the DHCP server on behalf of a requesting node in the network subnet, wherein the DHCP discovery message comprises an identifier of the network subnet; and receive a DHCP offer message from the DHCP server in response to the DHCP discovery message, wherein
the DHCP offer message comprises a network address for the requesting node, and
the network address is selected by the DHCP server from the address pool using the identifier of the network subnet.

8. The network routing device of claim 7, wherein the network subnet and the network subnets associated with each other network routing device are Thread Networks.

9. A network node configured to perform stateless autoconfiguration of addresses (SLAAC) in a network subnet having a neighbor discovery proxy (ND-proxy) border router, the network node comprising:

a network interface coupled to the network subnet; and
a processor, wherein the network node is configured to
determine an internet protocol version 6 (IPv6) domain unicast address (DUA) from a calculated interface identifier for the network interface, and
perform a procedure including:
determine a listening MAC address using the IPv6 DUA,
perform a hash calculation on the listening MAC address, and
use the IPv6 DUA if the last hash bits of the hash calculation on the listening MAC address are the same as a network hash value and the IPv6 address is not a duplicate of another node on the network subnet,
otherwise repeat the procedure with a new IPv6 DUA calculated by incrementing the IPv6 DUA or incrementing a duplicate address detection counter to determine a new IPv6 DUA.

10. The network node of claim 9, wherein the network node is further configured to:
query the ND-proxy border router for SLAAC interface identifier generation parameters; and
receive, in response to the query, the SLAAC interface identifier generation parameters and the network hash value.

11. The network node of claim 10, wherein the network node is further configured to:
calculate the interface identifier using the SLAAC interface identifier generation parameters.

12. The network node of claim 10 wherein the network hash value is a unique value for the network subnet.

13. The network node of claim 9, wherein the network node is further configured to:
determine a solicited-node multicast address from the IPv6 DUA, wherein
the solicited node multicast address comprises the last 24-bits of the IPv6 DUA, and
the listening MAC address is determined using the solicited node multicast address.

14. The network node of claim 13, wherein the listening MAC address comprises:
the last four bytes of the solicited-node multicast address as the last four bytes of the listening MAC address; and
the first two bytes are 33:33.

15. The network node of claim 9 wherein the hash calculation is a 32-bit cyclic redundancy check hash.

16. A method performed by a network routing device configured to perform neighbor discovery proxy (ND-proxy) tasks for a plurality of nodes in a subnet coupled to the network routing device, the method comprising:

hashing a multicast address received in a multicast message, wherein
said receiving the multicast message is an ND-proxy task, and
ND-proxy comprises responding to a network communication destined for one or more of the plurality of nodes in the subnet;
comparing a bit value selected using the hashed multicast address to a bit value stored in a hardware register selected using a local pool hash value, wherein
a pool hash value comprises a value identifying one of a plurality of address pools each associated with a separate subnet of a network comprising the network routing device, and
the local pool hash value comprises the pool hash value identifying the subnet; and
filtering the multicast message based on said comparing, wherein said filtering comprises
dropping the multicast message if said comparing does not result in a match, and
transmitting the multicast message to nodes in the subnet if said comparing results in a match, wherein
each of the plurality of nodes in the subnet have a unique network address, and
each of the unique network addresses is determined using the local pool hash value.

17. The method of claim 16 further comprising:
transmitting a multicast capability query message to one or more other network routing devices coupled to a network external to the subnet, wherein each other network routing device is configured to perform ND-routing tasks for one or more nodes in subnets associated with each of the other network routing devices;
receiving information regarding multicast capability of each other network routing device;

creating a list comprising the information regarding multicast capability of each other network routing device and the network routing device, wherein
the list is primarily in order of increasing multicast capability and secondarily in order of increasing address value for entries having the same multicast capability; and
associating a pool hash value with each entry of the ordered list, wherein the local pool hash value is one of the values in the ordered list.

18. The method of claim 17 wherein the multicast capability received from each other network routing device comprises a number of bits available for multicast hardware filtering on each of the other network routing devices.

19. The method of claim 17 further comprising:
responding to a stateless autoconfiguration of addresses (SLAAC) request for information from a requesting node in the plurality of nodes in the subnet; and
providing the pool hash value associated with the network routing device to the requesting node.

20. The method of claim 19 further comprising:
responding to a SLAAC message from the requesting node in the plurality of nodes in the subset, wherein
the SLAAC message comprises a request to check whether a network address generated by the requesting node is a duplicate of a previously assigned network address, and
the network address generated by the requesting node is generated using the pool hash value.

* * * * *